Jan. 1, 1924 1,479,663
A. HERZ
RELAY AND THE LIKE
Filed Feb. 16, 1920 7 Sheets-Sheet 5
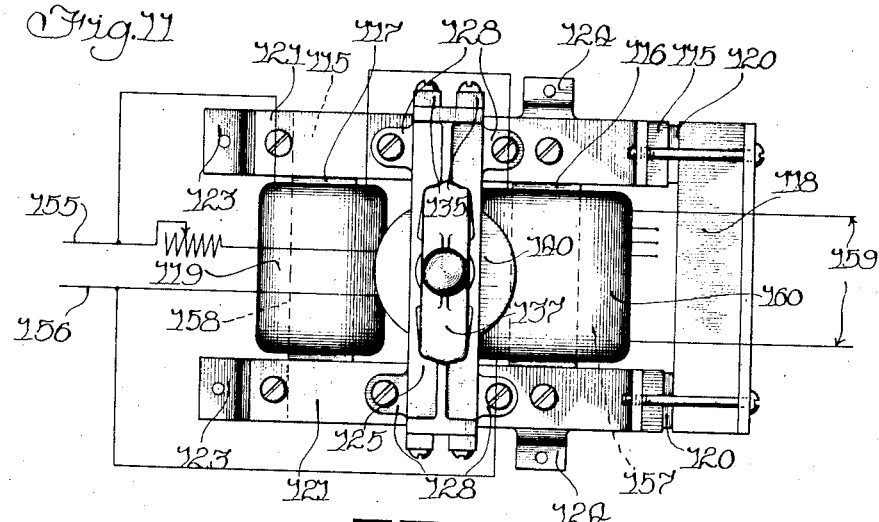
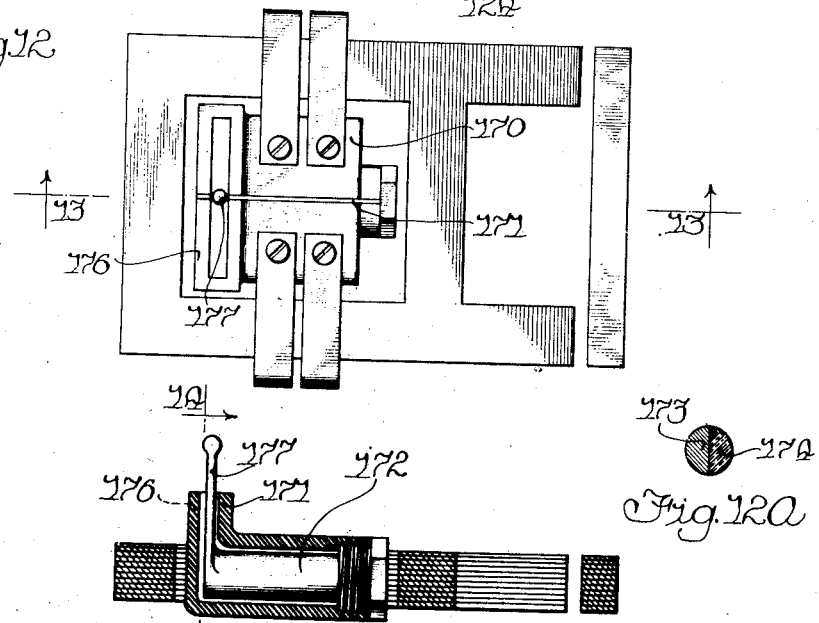
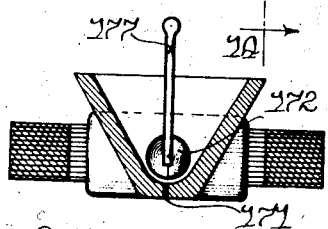
Inventor
Alfred Herz
By Brown, Boettcher and Dienner
Attorneys Jan. 1, 1924
A. HERZ
1,479,663
RELAY AND THE LIKE
Filed Feb. 16, 1920
7 Sheets-Sheet 6
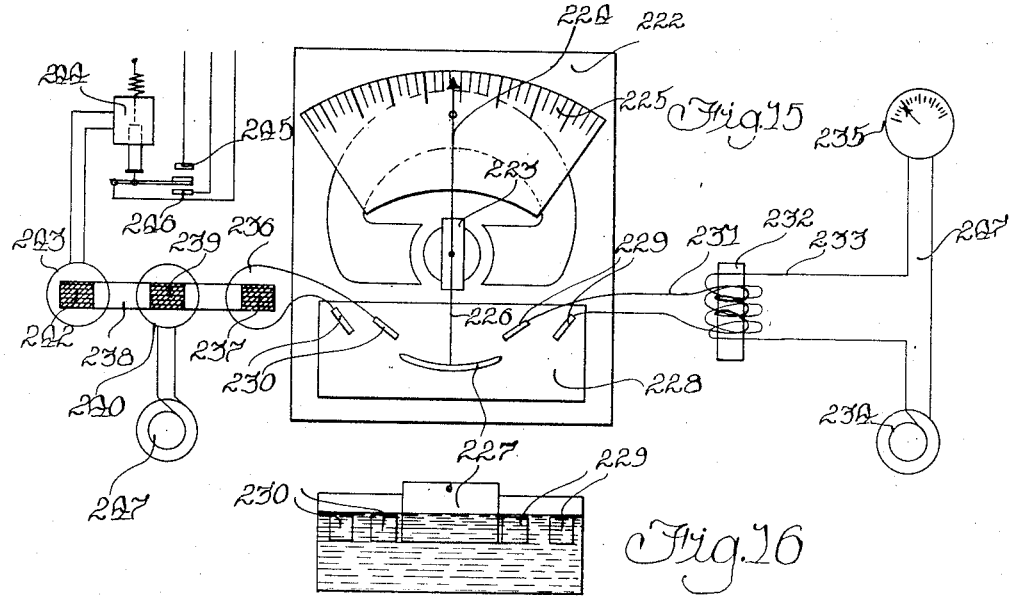
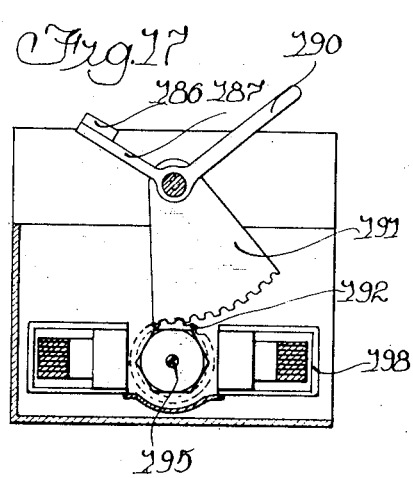
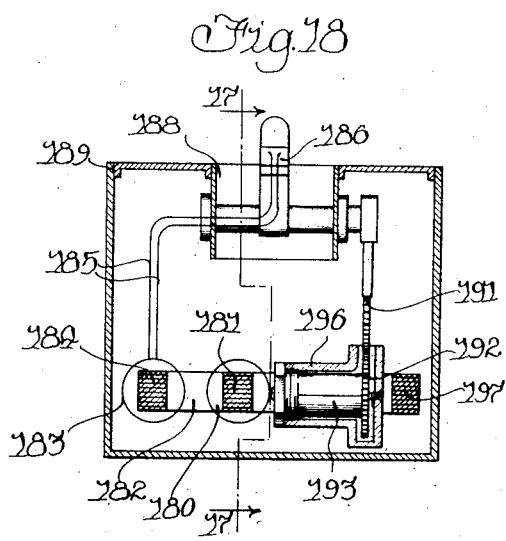
Inventor
Alfred Herz
By Brown, Boettcher and Dennis
Attorneys Jan. 1, 1924
A. HERZ
RELAY AND THE LIKE
Filed Feb. 16, 1920 — 7 Sheets-Sheet 7
1,479,663
Fig. 19
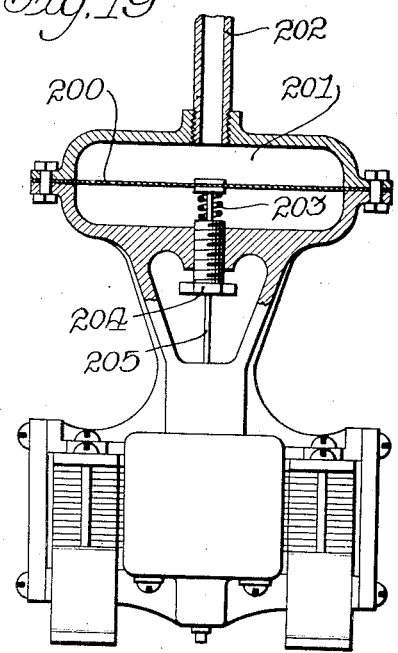
Fig. 20
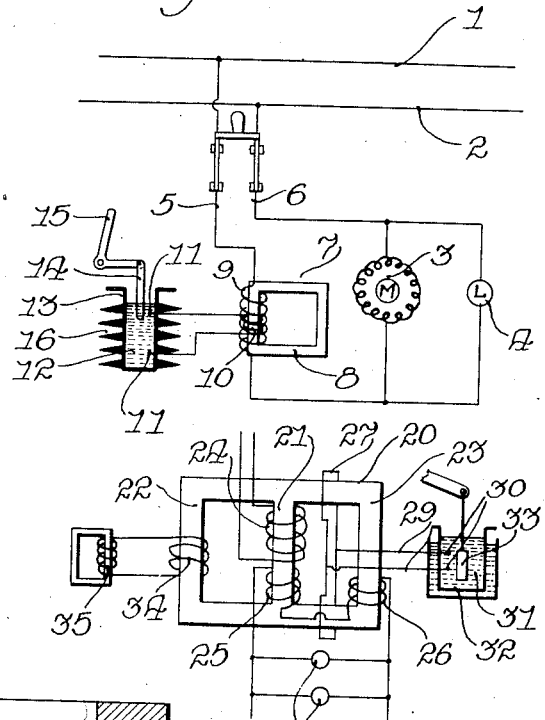
Fig. 21
Fig. 22
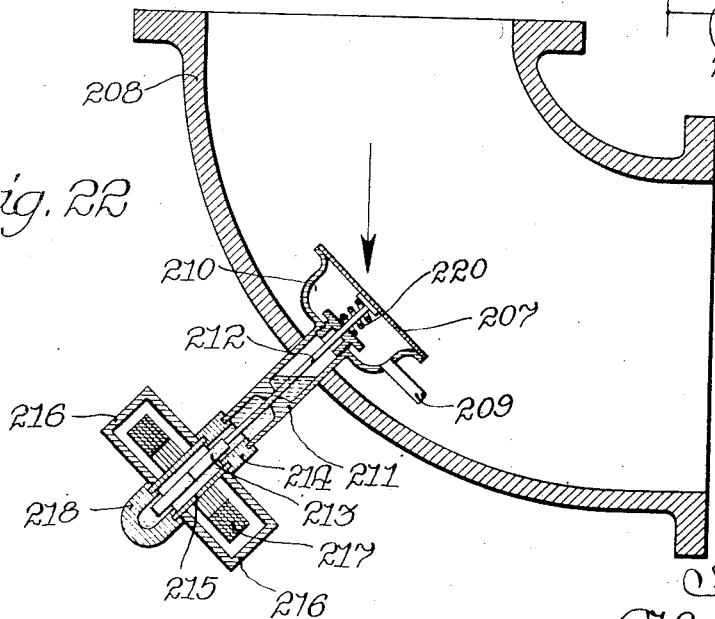
Inventor
Alfred Herz
By Brown, Bretcher & Dinner
Attorneys Patented Jan. 1, 1924.

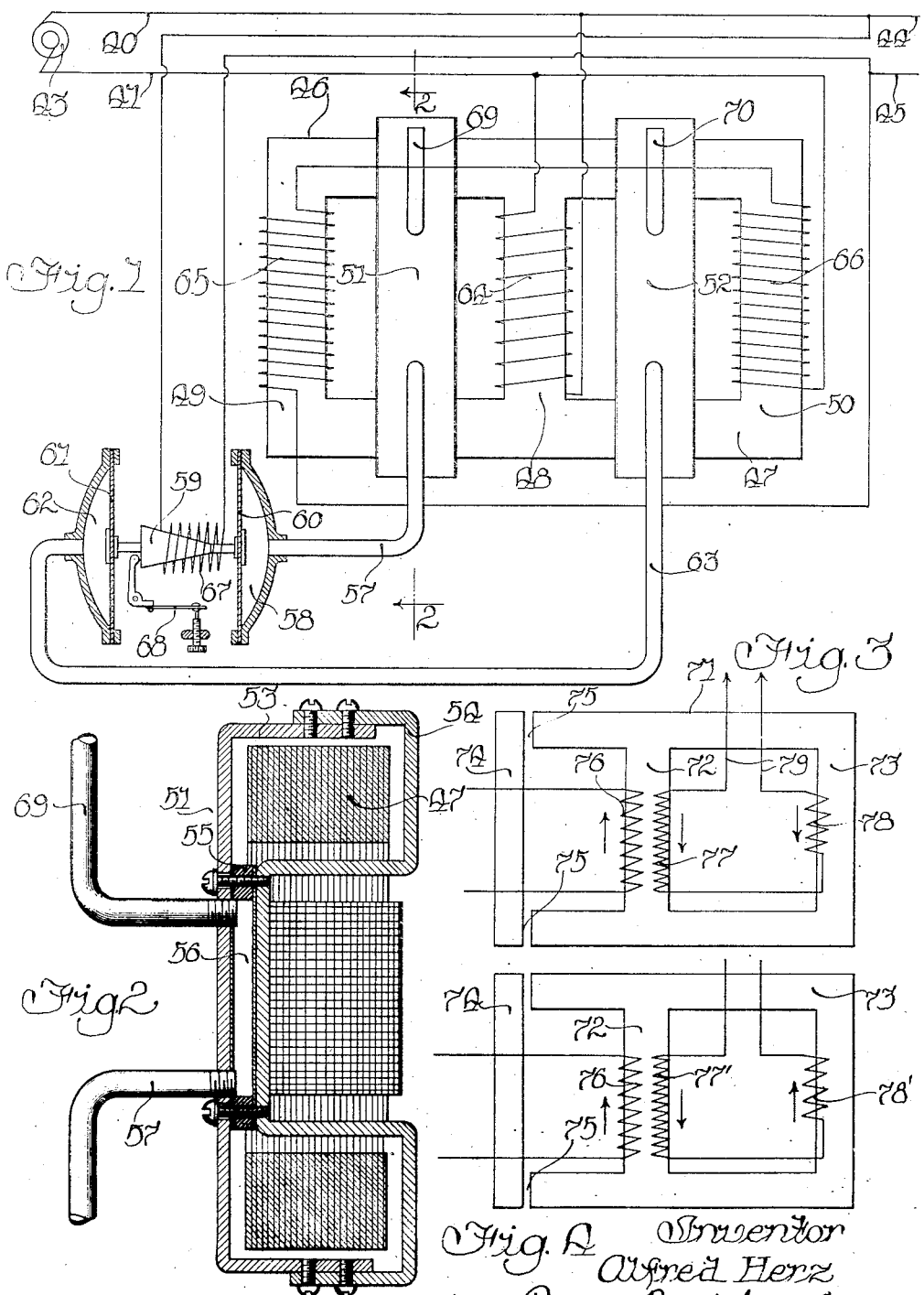

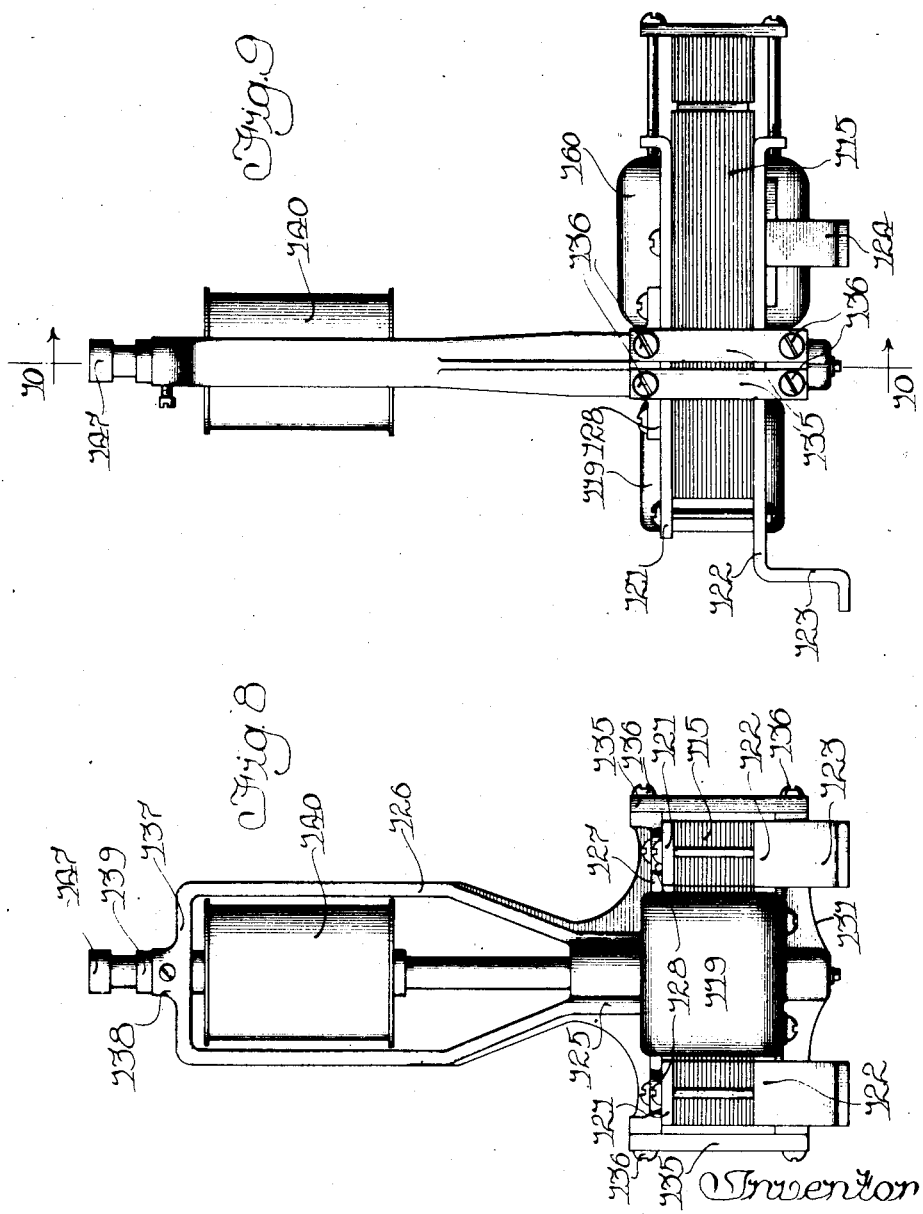

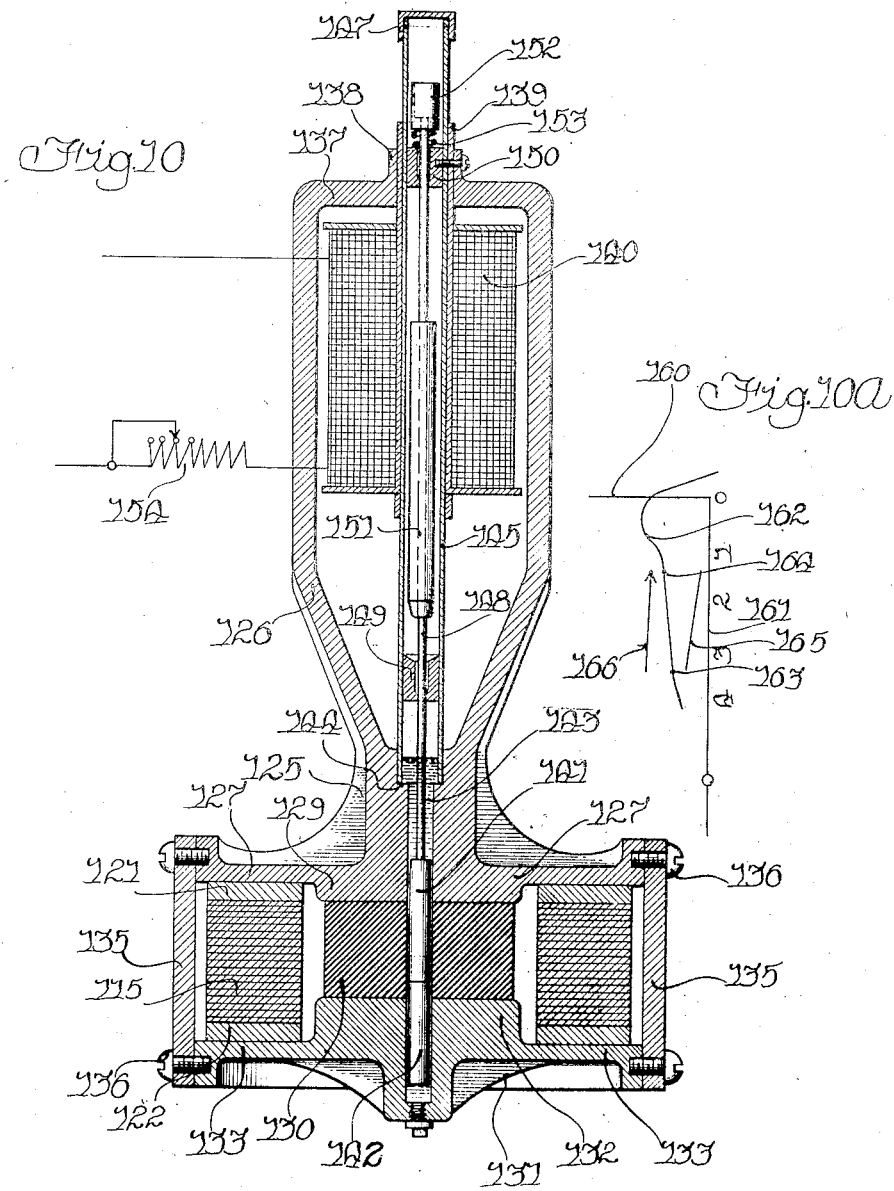

1,479,663

UNITED STATES PATENT OFFICE.

ALFRED HERZ, OF CHICAGO, ILLINOIS, ASSIGNOR TO GENERAL ELECTRIC COMPANY, A CORPORATION OF NEW YORK.

RELAY AND THE LIKE.

Application filed February 16, 1920. Serial No. 358,866.

*To all whom it may concern:*

Be it known that I, ALFRED HERZ, a citizen of the United States, residing at Chicago, in the county of Cook and State of Illinois, have invented a certain new and useful Improvement in Relays and the like, of which the following is a full, clear, concise, and exact description, reference being had to the accompanying drawings, forming a part of this specification.

My invention relates to relays and the like.

While I shall describe my invention particularly in connection with relay mechanism employed to secure a voltage control for controlling or varying the voltage of an electrical circuit, the invention is of much broader scope as will be apparent from the appended claims.

My invention is primarily based upon two principles; first, that mercury is a conductor of fairly high resistance as compared with copper; and second, that in alternating current work transformation of voltages through electro-magnetic linkage is feasible and practicable.

Mercury presents an ideal resistance element for circuits of very low voltage because of its fluidity. It is possible to make out of it a rheostat of continuously graded values corresponding to an infinite number of steps. Heretofore it has not been commercially feasible to employ it on circuits of commercial voltages of the order of 110 volts, because too great a length of mercury would be required to make such a rheostat have sufficient range of operation. At the same time the range of movement that would be required would make the rheostat wholly unsuitable for commercial work. The only alternative heretofore has been to reduce the cross section of the body of mercury to such a small value that again the rheostat would not be practicable.

I have brought the mercury rheostat into commercial voltages and have made it feasible and practicable by using a relatively large cross section of the body of mercury and yet having a range of movement relatively small, namely, of the order of about two inches for controlling the voltage over the full range.

In the preferred form of my invention I rely upon a third principle, namely that in a transformer the current flowing in the secondary winding sets up or creates a flux counter and substantially equal to the flux induced by the primary winding, disregarding magnetizing flux and core losses. This counter flux of a low voltage circuit I employ in the preferred form of my invention as a controlling flux whereby I can divert more or less of the primary flux from the path in which it would tend to flow into another path in which it would not normally tend to flow. In other words, I employ the counter flux of the low voltage circuit in which the mercury is included, as a means for governing magnetically the transformer ratio between the primary windings and the secondary windings.

Broadly, this feature of the present invention is disclosed in the co-pending application, Serial No. 208,015 filed December 20th, 1917, which has since resulted in Patent No. 1,331,065, granted February 17, 1920, of which the present application is a continuation in part. In the prior application I have shown the body of mercury as being movable in order to secure the variations of resistance, while in the present case I have shown, in addition, means whereby the body of mercury may remain substantially stationary with relation to the low voltage circuit, but a moving conductor short circuits the mercury to a greater or less extent.

The present invention is more particularly concerned with the matter of voltage regulation of a circuit and the specific claims herein are directed to the matter of such regulation.

In order to acquaint those skilled in the art with the manner of constructing and practicing the invention I shall now describe, in connection with the accompanying drawings certain specific embodiments of the invention.

Figure 1 is a diagram of one form of the invention in which the relay mechanism is employed to regulate the voltage on a line;

Figure 2 is a section of the core and short circuiting band shown in Figure 1 taken on the line 2—2 of Figure 1;

Figure 3 is a diagram of the connections of a regulator in which the windings are connected in opposition;

Figure 4 is a similar diagram in which the connections are such that the two secondary coils are connected in unison;

Figure 8 is an end elevation of the preferred form of the relay embodying my invention;

Figure 9 is a side elevational view of the same taken from the right of Figure 8;

Figure 10 is a vertical axial cross section taken on the line 10—10 of Figure 9;

Figure 5:
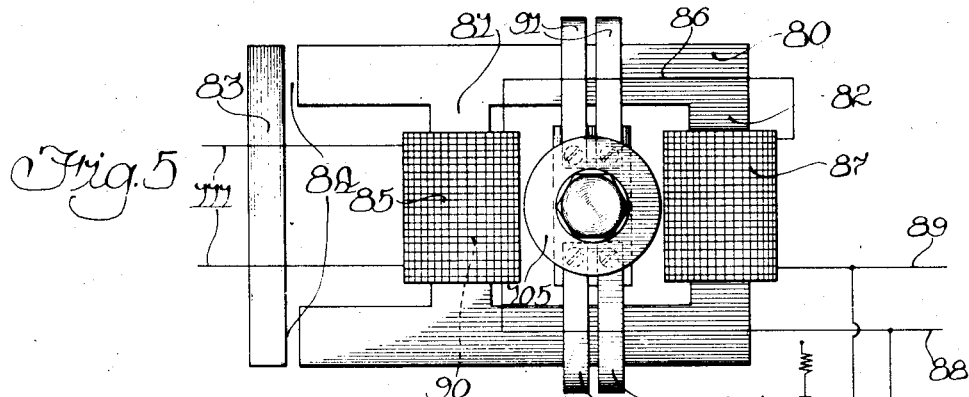
Figure 5 is a side elevational view of a relay for maintaining a constant voltage upon a desired line.

Figure 10$^A$ is a diagram illustrating the characteristics of the solenoid pull and the balancing effect of the plunger as it is submerged to a greater or less extent in the mercury;

Figure 11 is a top plan view of the embodiments shown in Figures 8, 9 and 10;

Figure 12 is a plan view of a modification in which a rotary core is employed;

Fig. 12$^A$ is a cross section of the rotary core;

Figure 13 is a longitudinal cross section taken on the line 13—13 of Figure 12;

Figure 14 is a section taken on the line 14—14 of Figure 13;

Figure 15 is a diagrammatic illustration of the manner in which my invention may be applied to a galvanometer for controlling various circuits;

Figure 16 is a fragmentary elevational view illustrating the manner in which the moving contact or electrode moves in the body of mercury;

Figure 17 illustrates in cross section on the line 17—17 of Figure 18 a cigar lighter embodying my invention;

Figure 18 shows a vertical cross section at substantially right angles to the cross section of Figure 17;

Figure 19 shows a form of the relay in which a pressure chamber and diaphragm is employed for moving the controlling element;

Figure 20 is a diagram illustrating the application of the invention to a control of a power or lighting circuit, as for starting an induction motor or for dimming lamps or the like;

Figure 21 is a similar diagram in which the low voltage circuit is employed for controlling the voltage on a secondary circuit such as a lamp circuit; and Figure 22 is an illustration of the application of my invention to a steam flow meter in which the impact of the steam operates the mercury resistance varying element directly.

As I have previously explained, it is possible, according to my invention to translate the resistance of a body of mercury in a low voltage circuit into a current of higher voltage by means of a transformer. As a simple illustration of this I may employ a mercury rheostat in a low voltage circuit which is in magnetic linkage with the circuit of a motor or of lamps or the like for controlling the voltage impressed upon the motor or the lamps as for starting the motor or for dimming the lamps or the like. The particular value of this arrangement lies in the fact that the movement of the electrode in the mercury gives an evenly graduated variation of voltage which corresponds to a rheostat having an infinite number of contacts. The result is that the voltage can be varied with an evenness which is impossible in a rheostat having fixed contact points. In starting motors or the like, where a rheostat with a number of points, or an auto transformer with a number of taps is employed, the time between making contacts may be such that the magnetization of the iron will be of such a direction in respect to the direction of the current flow at a particular instant that a very lively disturbance is created due to the discontinuity of the rheostat connection. In my invention this is not possible and consequently the change of voltage causes no disturbance on the line. Where a fine adjustment of the voltage is essential, or where gradual increase or decrease is desired, the device of my invention provides ideal means. Particularly is this true with regard to such apparatus as theater dimmers and the like. To illustrate this, I have indicated in the diagram of Figure 20, a pair of supply lines 1 and 2 which are connected to an induction motor 3 and a lamp 4 to illustrate current consuming devices and I have included in the leads 5 and 6 which lead to the motor and to the lamp, a transformer element 7 which consists of the core 8, a primary winding 9 and a low voltage secondary winding 10. The low voltage winding 10 may consist merely of a few turns of a conductor having large current carrying capacity, the ends of this conductor terminating in contacts or electrodes 11 in a body of mercury 12 contained within a suitable receptacle 13. A movable plunger 14 is adapted to be projected into the mercury adjacent the contacts 11 to vary the current flow between the electrodes 11. This plunger may be moved by suitable mechanism, either manual or automatic. I have illustrated the handle 15 for accomplishing this purpose. The plunger 14 may be made of either metal or of a non-conducting substance, depending upon the manner of operation. If a metallic electrode is employed, such as copper, then the downward motion of the plunger 14 displaces some of the mercury and substitutes therefor a body of greater conductivity in which case the current flow between the electrodes 11 will be increased. If a plunger of a non-conducting material is substituted, then the downward movement of the plunger 14 displaces some of the mercury and increases the resistance between the electrodes 11. In the present illustration I intend the plunger 14 to be of copper so that the downward movement of the plunger 14 has a resistance reducing effect upon the secondary winding 10, whereby the inductance of the primary winding 9 is decreased and an increase of voltage upon the motor 3 and the lamp 4 is caused. In other words, the short circuiting of the low resistance secondary winding 10 practically eliminates the transformer 7 from the circuit and permits the full voltage to act upon the current consuming devices 3 and 4. The mercury containing tank 13 naturally tends to be heated by the flow of current therethrough, as this body of mercury 12 forms the resistor. Consequently it is necessary to take care of the heat generated therein, and if this is of considerable duration the tank 13 may be provided with radiating fins 16 or other cooling means, such as submerging in an oil bath.

Instead of employing the low voltage, low resistance secondary as a direct choke for the primary, it may serve as a means for controlling the relation between the primary and secondary, or between the primary and a part of the secondary such as I have illustrated, for instance, in Figure 21. In this case I provide a magnetic core 20 having the three limbs 21, 22 and 23. This core is preferably made up of laminated sheets of transformer iron with the primary winding 24 wound upon the central leg. A secondary winding 25 is wound upon the same core preferably inside of the winding 24 as is customary in transformer practice, another part of the secondary winding, comprising the coil 26, being wound upon the one leg of the core 23. The two secondary windings 25 and 26 are connected together in series, preferably, with their voltages opposing and the outer terminals are connected to the load, in this case illustrated as the current consuming devices such as lamps 28. A heavy copper loop 27 surrounds the magnetic core 20 between the magnetic limbs 21 and 23, this loop being provided with leads 29 terminating in contacts 30 within the body of mercury 31, which is contained in the vessel 32. A plunger 33 is adapted to control the conductivity of the body of mercury between the contacts 30 for controlling the short circuiting effect of the loop 27 which is thus transformed into a double loop consisting of one loop about each part of the core between the limbs 21 and 23. Normally the magnetic flux which is created by the winding 24 tends to pass through the limb 23 for the reason that the limb 22 has thereupon a winding 34 connected to an inductance 35 whereby the passage of magnetic flux through the limb 22 is resisted to a certain degree. According to the position of the plunger 33 the short circuiting loops formed by the conductor 27 choke out to a greater or less extent, the magnetic flux from the limb 23 so that the bucking effect of the winding 26 is decreased or increased as the case may be, to control the voltage upon the current consuming devices 28.

The position of the plunger 33 may be controlled manually or automatically. In the embodiment particularly illustrated in Figures 5, 6 and 7, and in the embodiment of Figures 8, 9, 10 and 11, the plunger is automatically controlled by the voltage which is regulated to maintain the voltage constant. In the embodiment shown in Figures 12 to 14 inclusive, the control of the voltage is manual. In the embodiment shown in Figure 19 the voltage control is in accordance with the pressure in the pressure chamber which has a static pressure operating thereupon. In the embodiment of Figure 22 the plunger is controlled by the kinetic pressure of the flow of a fluid in the conduit with which the device communicates. The device illustrated in Figures 15 and 16 is controlled by a movable member, in this case the pointer of a galvanometer. The embodiment of Figures 17 and 18 is also manually controlled.

Figures 1 and 2 illustrate diagrammatically a simple voltage regulating device embodying my invention, in which the incoming leads 40 and 41 are connected to a suitable source of current such as 43 and the outgoing leads 44 and 45 are connected to the circuits upon which a constant potential is desired. The regulator 46 comprises the magnetic core 47 having the central limb 48 and the two outer limbs 49 and 50, these three limbs being connected by the main body of the core. A pair of heavy copper bands 51 and 52 preferably made up of flat bars, surround the cores between the limbs 49 and 48 and between 48 and 50. These copper bands are made up of two flat bars of copper 53 and 54 shaped as illustrated in Figure 2 so that the central part of the bars between the upper and lower portion of the magnetic core 47 approach each other. A piece of insulating material 55, with a central slot 56, is clamped between the central part of the bars 53 and 54 to form a chamber. The lower part of the chamber 56 communicates by way of a pipe or conduit 57 with a suitable diaphragm chamber 58 which is connected to a suitable magnetic core 59, this core being connected to the diaphragm 60 of the chamber 58, and also to the diaphragm 61 of the diaphragm chamber 62, which latter communicates by way of a pipe or conduit 63 with a chamber similar to the chamber 56 formed by the copper bar or loop 52 on the right hand side of the central core 48.

The central core 48 has the primary winding 64 thereupon, this winding being bridged across the incoming mains 40 and 41. The limbs 49 and 50 also have windings 65 and 66 respectively, these windings being connected together in opposition and being connected together in series in the conductor 41 which leads to the constant potential circuit 44—45. The operating solenoid 67, which actuates the core 59, is bridged across the constant potential mains 44 and 45 to maintain the potential as nearly as possible at a uniform value. A suitable control spring 68 for the core 59 is provided.

The diaphragm chambers 58 and 62, the pipes 57 and 63, and part of the chambers of each short circuiting band 51 and 52 are filled with mercury. Consequently movement of the core 59 to one side or the other will cause a rise of the column of mercury in one chamber and a lowering of the column in the other chamber so that the magnetic flux is positively driven from one side of the core to the other, whereby the transforming ratio of the central winding 64 to the secondary windings 65 and 66 is suitably changed.

Each of the small chambers formed in the short circuiting bands 51 and 52 is open to the atmosphere at the top through the pipes 69 and 70 which serve as stand pipes in case the mercury should tend to rise above the top of the corresponding chamber. These pipes also serve for the introduction of mercury in case more is required.

Whereas in Figures 1 and 2 I have illustrated how the flux is positively shifted from one winding to another, I shall now illustrate in connection with the preferred form of the invention the manner in which I cause the flux normally to pass through one limb of the magnetic core by means of an air gap or air gaps between the central limb and the other limb and then choke the magnetic flux from the course in which it would naturally tend to go and force it across the air gap or air gaps to change the transformer ratio between the windings.

As illustrated in Figure 3 the magnetic core 71 has a central limb 72, an outer limb 73 in direct magnetic connection therewith, and an auxiliary limb 74 connected with the central limb 72 through air gaps 75. The central limb 72 is energized by a suitable primary winding 76 such as the ordinary 110 volt alternating current circuit, the magnetic flux thereof normally tending to pass through the limbs 72 and 73 energizing the secondary windings 77 and 78 which are wound thereupon respectively. The winding 78 is connected in opposition to the main secondary winding 77 and the two windings in series are connected to the load which is to be maintained at a desired potential in the case of automatic regulation, or the voltage of which may be varied as desired in the case of voltage control.

In the case of automatic voltage control the controlling winding is connected in bridge of the line 79 for maintaining the voltage constant.

In Figure 4 I have illustrated diagrammatically how the two secondary windings 77' and 78' may be connected in the same direction instead of in opposition.

Figure 6:
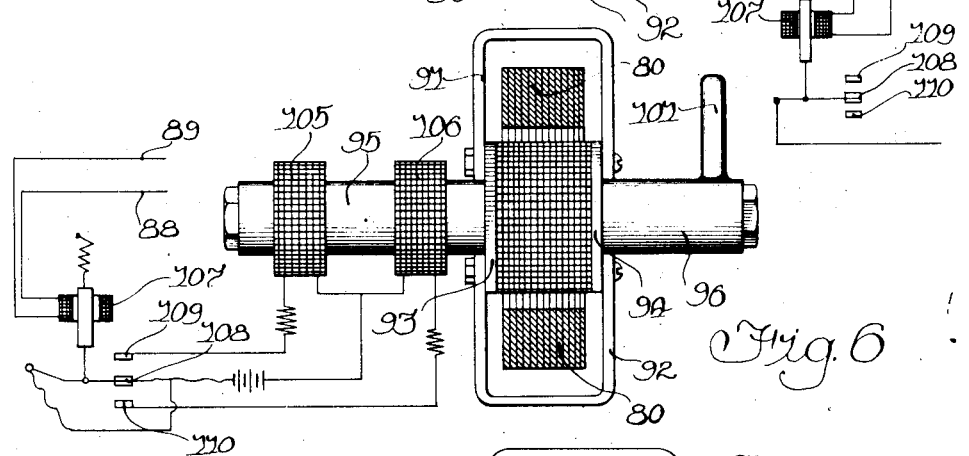
Figure 6 is an end elevational view of the same.
Figure 7:
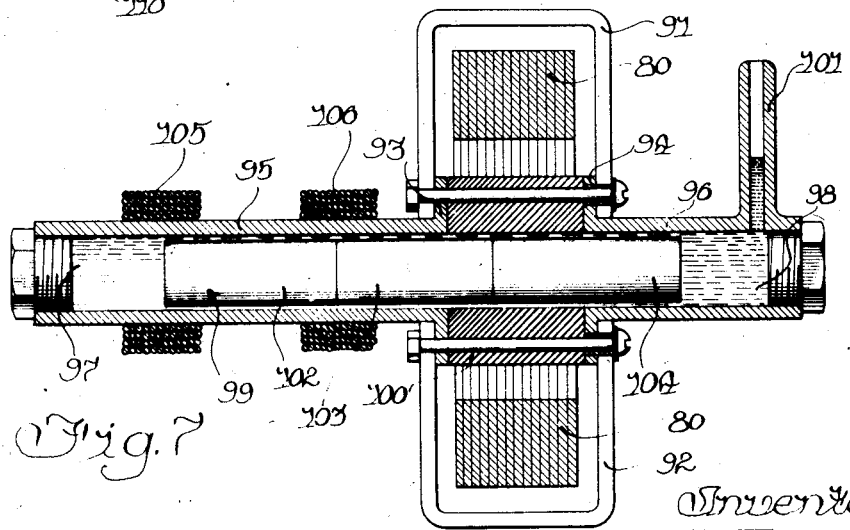
Figure 7 is a longitudinal cross section on a slightly larger scale than Figure 6.

In the embodiment shown in Figures 5, 6 and 7 the magnetic core 80 has the central limb 81 and the two limbs 82 and 83, the latter of which is separated by the air gaps 84 so that the magnetism which is set up by the primary coil 85 tends to pass solely through the central limb 81 and the limb 82, the air gaps 84 being adjusted to present a much larger reluctance in the left hand magnetic circuit than in the right hand magnetic circuit. A secondary winding is wound inside of the winding 85 on the core 81 and one terminal of this winding is connected by means of the conductor 86 with the coil 87, which is wound on the limb 82. The other terminal of the main secondary winding is connected to the constant voltage main 88. The free terminal of the coil 87 is connected to the constant voltage main 89, the two secondaries 90 and 87 being connected in series and in opposition. The low voltage or short circuiting loop is formed of the flat straps or conductors 91 and 92 which are bolted to the flanges 93 and 94 of copper castings 95 and 96 having cylindrical extensions hollowed out at 97 and 98 to form a straight bore for receiving the composite core or plunger 99. The flanges 93 and 94 clamp a block of insulating material 100 between them, this block of insulating material being provided with a bore in line with the bores 97 and 98. The ends of the bores 97 and 98 are closed by suitable plugs to form a chamber which is closed except for the standpipe 101 formed on the casting 96. The compound core 99 fits relatively closely within the chamber in which it is mounted and this chamber is completely filled otherwise with mercury. The compound core consists of an iron plunger 102, joined axially to a copper plunger 103 and also to an insulating plunger 104, these three members being of the same diameter and being connected together axially in line. The position of the copper plunger 103 and the insulating plunger 104 may be interposed, depending upon the manner of connections of the solenoid windings 105 and 106, which actuate the magnetic core member 102. These windings 105 and 106 are mounted upon the tubular extension of the casting 95. If desired, the cylindrical extensions of the flanges 93 and 94 may be made of insulating material and secured to the flanges 93 and 94, which must be of good current and heat conducting material. The compound core 99 does not change the amount of mercury connecting the flanges 93 and 94 but it does change the conductivity between these flanges by shunting out to a greater or less extent the mercury which connects the said flanges. The energization of the windings 105 and 106 is controlled by a voltage controlled solenoid 107 which has a moving contact 108 adapted to make contact with either of the contacts 109 or 110 for energizing the windings 105 or 106 respectively. The voltage controlled solenoid 107 is connected to the mains 88—89, which as above explained, are in series with the secondary windings 90 and 87.

The shape of the copper member 103 or the insulating member 104 may be varied to give sharper changes in the short circuiting effect or less sharp changes, as may be desired. The compound plunger 99 moves with relatively great freedom within the body of mercury, but there is a certain dash pot effect due to the trapping of the mercury and the necessity for displacing the mercury endwise along the sides of the core. There is also a certain amount of friction due to the flotation of the core against the top of the chamber in which the core moves by the buoyant effect of the mercury. Assuming that the incoming mains 111 in Figure 5 are connected to a suitable source of alternating current and that a constant voltage is desired upon the mains 88—89, the magnetic flux which is generated by the winding 85 normally passes through the limbs 81 and 82, very little of the flux, if any, passing across the air gaps 84 into the limb 83 so that the two windings 90 and 87 are both energized. The winding 90 tends to give a voltage which is in excess of the voltage desired on the mains 88 and 89 and the secondary coil 87 is in opposition thereto tending to generate a voltage which would reduce the voltage of the coil 90 to less than the desired voltage. A medium between the two must be sought for the desired voltage. The voltage controlled relay 107 governs this condition. If the voltage on the mains 88—89 is low the relay contact 108 will energize the winding 106, which in turn moves the compound core to the right as shown in Figure 7, causing a greater short circuiting effect by means of the bands 91—92 and the flanges 93 and 94, about the core between the limbs 81 and 82. As a consequence the effect of the bucking winding 87 is diminished and the main secondary winding 90 preponderates, thereby raising the voltage. This in turn causes the voltage controlled relay 107 to separate the contacts 108 and 110, permitting the compound core 99 to remain in the position in which it was left. If the voltage rises too high on the mains 88—89, the relay 107 is energized to close the contacts 108 and 109, whereby the compound core 99 is moved to the left, permitting a greater action of the bucking winding 87, thereby reducing the voltage.

As previously explained, the plunger which controls the resistance between the copper bands 91 and 92 may consist entirely of copper, or may consist entirely of insulation, in which latter case the insulation would merely displace the mercury to a greater or less extent and thereby increase or decrease to a greater extent the resistance of the same. I have tried both forms and I find that for special ranges, one or the other may be more or less suitable.

In the preferred embodiment shown in Figures 8 to 11 inclusive, I have mounted the compound core or plunger in a vertical position, permitting the same to extend above the body of mercury for the special purpose of balancing by the variations in buoyant effect the variation in effectiveness of the solenoid which operates upon the magnetic member. In this construction the core member 115 comprises the central limb 116, which has a main primary and a main secondary winding thereupon and the two auxiliary limbs 117 and 118, the former of which is provided with the auxiliary or bucking secondary winding 119 and the latter of which is separated from the main core by means of the air gaps 120. The magnetic core 115 is suitably clamped between binding strips 121 and 122, at each side, the latter strips being bend downwardly to form suitable mounting legs 123. A flat transverse binding strip lying in line with the central core 116 is also bent downwardly at each side to form the mounting legs 124. A copper casting 125, having an upwardly extending frame 126 and laterally extending arms 127 at its lower end, is clamped by means of the lugs 128 to the upper binding strips or bars 121. The copper casting 125 is circular at its lower end and is provided with a central boss 129 which, as will be explained later, serves as a face against which the body of insulating material 130 is clamped. A copper casting 131 lies on the lower side of the core and has a central boss 132 similar to the boss 129 for clamping the body of insulation 130. The copper casting 131 also has laterally extending arms 133 which are adapted to be connected to the laterally extending arms 127 of the casting 125 by means of the copper straps 135 which are fastened to the ends of the arms by suitable screw bolts 136. The upper part of the frame 126 has a cross bar 137 provided with a central boss 138, which is bored out axially to receive a mounting sleeve 139 for the solenoid 140 which is thus secured to the upper end of the frame 126. The lower central portion of the casting 125 and the central portion of the casting 131 have a central axial bore in line with the axial bore in the boss 138 at the top of the frame 136. The body of insulation 130 also has a bore in line therewith for receiving the lower end of a compound plunger comprising the cylindrical copper rod 141 which has the insulating extension 142 of the same diameter secured to the lower end thereof. The central axial bore 143 is counterbored at its upper end to form the shoulder 144 and into this counterbore is fitted a cylindrical sleeve 145 which extends up through the boss 138 at the top of the frame 126 and is closed by a cap 147 at its upper end. The copper rod 141 which extends down into the bore 143, is connected by a piece of drill rod or other suitable material, which forms an upwardly extending stem 148 guided in the guides 149 and 150. A suitable iron core 151 is mounted upon the stem 148 and this core extends part way into the solenoid winding 140. This iron core is slotted lengthwise to prevent eddy currents and is adjustably mounted on the stem 148. At the upper end of the stem a cup 152 is mounted, this cup being adapted to receive small graduating weights such as lead shot, for properly counterbalancing the upward thrust due to the buoyant effect of the mercury which fills the bore 143 and surrounds the compound plungers 141 and 142. Between the bottom of the cup 152 and the top of the guide 150 I place a small pumping spring 153.

The circuit of the solenoid winding 140 should be as nearly as possible made of such material as would give a zero temperature coefficient. In practice I find it advisable to form the major portion of the solenoid circuit of a composition resistance wire, for example a material known as IaIa. However, the winding of the entire solenoid coil with this wire would give too high a resistance for the dimensions which I have designed and I therefore wind the coil with a fairly large copper conductor and place in series a proper length of resistance wire of the above character. In this manner the temperature co-efficient of the entire circuit is very greatly reduced, so that resistance changes due to temperature are practically negligible. I make part of the resistance adjustable as indicated at 154. The solenoid 140 is connected across the constant potential mains 155 and 156 to which the two secondary windings are connected in series, in the manner indicated in Figure 3. These two windings, consisting of the main secondary winding 157 and the auxiliary secondary winding 158 are connected together in series and in opposition. The main secondary winding 157 is wound on the core 116 on the inside of the main primary winding 160 which is connected to the alternating current mains 159 which are connected to a suitable source of power.

When the device is in operation the current which flows through the two loops created by the two copper castings 125 and 131 with their connecting links 135 and the central connection by way of the body of mercury and the copper core 141 at the center causes a heating of the mercury, which heat is transmitted to the copper castings. The upper casting, which has a frame 126 connected thereto for mounting the solenoid winding 140, is cooled quite effectively by the rising air, whereby the upper end of the frame is kept fairly cool but at substantially a constant temperature after the device is once in operation. These copper members are employed to serve both as electrical conductors for the passage of the heavy current which must flow in the short circuiting loop, and also as heat conductors for dissipating the heat which is generated in the mercury and in the copper rods 141.

I have designed the solenoid 140 and the compound plunger which is operated thereby so as to secure a very large range of voltage regulation. As shown in Figure 10$^A$ in which the horizontal line 160 represents the amount of solenoid pull and the vertical line 161 represents the position of the core 151 with respect to the solenoid 140 the curve 162 which shows how the pull varies for the different positions of the core. It will be seen that between the points 163 and 164 the characteristic of this curve is a straight line, or substantially a straight line.

It can also be seen that as the stem 148 of the compound plunger is raised out of the body of mercury in the bore 143, the buoyant effect of the mercury upon the compound plunger becomes less according to a straight line law of action, as shown by the curve 165. The combination of these two effects produces an upward thrust which is uniform over a range represented by the distance between the points 164 and 163, or at least so nearly constant and uniform that the compound core will remain stationary at any point between those limits when the voltage upon the coil 140 is substantially constant at the desired value. This is a very important feature of my invention and is, I believe, a feature which has not heretofore been attainable in the art where a simple moving element is employed to regulate the voltage. The result is that the regulation upon the constant voltage mains 155 and 156 is extremely close. I find also in practice that the solenoid 140 need carry only from .4 to .6 of an ampere, which is comparable with the best commercial practice in contact making voltmeters.

In Figures 12, 13 and 14 I have illustrated the manner in which a two part rotary core may be employed instead of a core moving axially. In this case the two part copper casing 170 is separated by a strip or gasket of insulation 171, this casing being filled with mercury and containing a rotary core 172, which is divided vertically, half of the core being of copper as shown at 173 in Figure 12ᴬ and the other part being made of an insulating material as shown at 174 in the same figure. To prevent the escape of mercury the hollow casing 170 may be mounted vertically or an upwardly extending rim or flange 176 may be provided through which an operating member such as the lever 177 may extend. The lever 177 may be moved manually or automatically in any preferred manner, the operation being otherwise of the same general character as previously described in connection with Figures 5 to 11 inclusive. I have not shown the circuit connections of this embodiment but the same is of the general character shown in Figure 3.

In Figures 17 and 18 I have indicated how the rotary core may be applied to a device such as a cigar lighter, in which the primary winding 180 on the central limb 181 of the core 182 is connected to the usual alternating current lighting mains and the secondary winding 183 which is wound upon the outer limb 184 of the core 182 is connected by suitable conductors 185 to a small seating element 186 carried on a bell crank lever 187 mounted in a suitable depression 188 of the main containing case 189. The bell crank lever 187 has a suitable handle 190 which is connected by means of a gear sector 191 and a pinion 192 to the rotary core 193 which is of the character shown in connection with Figures 12 to 14 inclusive. The core 193 may be suitably journaled upon the small steel screws 195, extending axially inward from the ends of the copper casing 196, which copper casing is split vertically as previously explained, the core 193 being made up of two parts, as explained in connection with Figure 12. Depression of the handle 190 to raise the heating element 186 chokes the magnetic flux which is normally flowing in the limb 197 of the core 182 out of said limb and forces the same through the limb 184, thereby energizing the winding 183 to heat the small resistance element 186 to incandescence.

Normally the effect of the short circuiting bands 198 is so small that the flux flowing through the limb 197 of the core 182 causes the main primary winding 180 to have such a high counter E. M. F. that very little current flows through said winding, consequently during the period that the cigar lighter is idle, very little current is employed.

In Figure 19 I have illustrated a form of voltage controlling device similar to the device shown in Figure 8 to 11 inclusive, in which the compound plunger instead of being operated by a solenoid, is operated by a diaphragm 200, this diaphragm being mounted in a suitable pressure chamber 201 connected by a suitable pipe 202 to any source of pressure which it is desired to employ as a means for controlling the voltage on a given circuit. Thus the pressure on the diaphragm 200 may operate an indicator or any electro-responsive device, as desired. A suitable balancing spring 203 is mounted on the lower side of the diaphragm 200, this spring being adjustable by means of a suitable nut 204 which in this case serves as a guide for the operating rod 205 that controls the operation of the compound plunger illustrated in Figure 10.

In Figure 22 I have indicated the manner in which the device embodying my invention may be applied directly to the measurement of the flow of fluid such as steam, air, water or the like, in a closed conduit. In this case I have placed a movable diaphragm 207 in an elbow 208 in the conduit in which the fluid is flowing so that the impact of the fluid operates upon the diaphragm 207 to depress the same. The other side of the diaphragm is in communication with the interior of the elbow 208, as by means of the short pipe 209 which may have a certain degree of suction exerted thereupon. The diaphragm chamber 210 and the extending pipe 211 may be made of steel tubing properly formed to shape, the steel tubing being suitable for the resisting of whatever pressure may exist within the conduit 208. A stem 211 is connected at its upper end to the diaphragm and at its lower end to a compound plunger 213, the upper end of which may be made of copper and the lower end of insulating material with a body of mercury filling the lower part of the tube 211 and its connected parts. A copper ring 214 is connected to the lower end of the tube 211 and a second steel tube 215 is connected between the copper ring 214 and a copper cap 218. The resistance of the steel tube 215 is so high that it does not appreciably affect the operation of the instrument. Short circuiting loops or straps 216 are connected on opposite sides of the ring 214 and the cap 218 and enclose the opposite sides of the core 217 in a manner which is obvious from the prior explanation. Thus the movement of the diaphragm 207 against the balancing spring 220 serves to control the resistance of the short circuiting loops 216 whereby the voltage of the secondary winding on the core 217, which winding is not shown, is suitably controlled to operate an instrument responsive to voltage changes which may be graduated directly in terms of flow.

In Figures 15 and 16 I have illustrated the manner in which the principle of my invention may be applied to the control of circuits by the movement of objects or members which of themeselves have not sufficient force to operate contact making devices, or rheostats or the like. In this case I have shown the galvanometer 222, which has the movable coil 223 controlling a needle 224 movable over the scale 225, the needle 224 being connected by an extension 226 to a copper blade or electrode 227 movable between pairs of contacts such as 229 or 230. The contacts 229 and 230 are submerged beneath the surface of the body of mercury 228. The movable copper electrode or plate 227 is partially submerged in the body of mercury to just a sufficient degree to counterbalance the weight thereof. Consequently, it will be moved very readily and without any strain upon the pivots of the moving element of the galvanometer, and in moving to the right or to the left it will decrease the resistance between the contacts 229 or the contacts 230, as the case may be. The contacts 229 are shown as connected to the secondary winding 231 of the transformer 232, the primary winding of which is shown at 233 in circuit with a source of alternating current 234 and a suitable indicator 235, which may thus be made responsive to the position of the needle 224. Thus by means of a very light moving element such as that of the galvanometer, a relatively heavy flow of current may be continuously and smoothly controlled.

In the system shown at the left of Figure 15, I have shown the contacts 230 as connected in series with a short circuit winding 236 upon the limb 237 of a suitable three part magnetic core 238. The central limb 239 has a primary winding 240 thereupon, which is energized from a suitable source of alternating current as shown at 241. The third limb, 242, has a secondary winding 243 thereupon which is connected to a suitable relay which is responsive to the voltage variations of the coil 243. This relay may control any suitable contact such as the front contact 245 and the back contact 246 for operating any desired mechanism.

Thus in the circuit shown at the right of Figure 15, the electrode 227 controls a short circuiting winding directly upon the primary flux of the circuit 247, while in the circuit at the left the electrodes 230 control the distribution of flux in the core whereby the ratio between the primary and secondary windings is controlled.

I do not intend to be limited to the precise forms or details disclosed.

I claim:

1. In combination, a winding adapted to be connected to a source of periodically varying current, a variable resistance conductor for varying the conductive effect of said winding, said conductor comprising a conducting fluid and a movable member conductively in parallel relation with said fluid, and means governed by the variations in inductive effect of said winding.

2. In combination, a relatively fixed magnetic core, an inductive winding relatively stationary with respect to said core, said winding being adapted to be connected to a source of periodically varying current, a shunt of variable resistance about said core, said shunt comprising a relatively stationary body of conducting liquid, means for varying the conductivity of said liquid, said latter means controlling the amount of flux linkage between the magnetic core and the inductive winding, and means governed by said variation of flux.

3. In combination, a relatively stationary winding adapted to be connected to a source of periodically varying current, means for varying the flux through said winding comprising a liquid conductor, means controlled by the variation of magnetic flux and means other than movement of the conducting liquid for varying the effective cross section of said liquid conductor.

4. In combination, a winding adapted to be connected to a source of periodically varying current, a core adapted to be energized by said winding, means for causing a flux leakage between the winding and the core, said means comprising a variable resistance conductor including a conducting liquid, and movable means for varying the effective conductivity of said liquid.

5. In combination, a body of conducting liquid, a relatively stationary winding adapted to be connected to a source of periodically varying current, means controlled by the variation of magnetic flux, means other than movement of the body of conducting liquid for varying the conductivity thereof, and means controlled by said variations of conductivity for varying the magnetic flux through said winding.

6. In combination, a body of conducting liquid, means other than movement of the body of conducting liquid for governing the conductivity thereof, a winding adapted to be connected to a source of periodically varying current, means governed by the periodically varying flux generated by said winding, a magnetic core for the winding and means controlled by the conductivity of said body of liquid for varying the effective permeability of said core.

7. In combination, an inducing winding adapted for connection with a suitable source of alternating current, a core for said winding, a secondary winding adapted to have an electro responsive device governed by the voltage of said secondary winding, and a choking winding of large current conducting capacity and of low induced voltage, said winding including a relatively stationary body of mercury, which body of mercury comprises the major portion of the resistance of said choking winding.

8. In combination, a primary winding, a source of periodically varying current for said winding, a choking circuit including a liquid resistor for controlling the magnetic effect of the winding, an electrical responsive device governed by the magnetic effect of said winding, said choking winding having a movable electrode in contact with said liquid resistor, and means for moving said electrode.

9. In combination, a primary winding, a source of periodically varying current for energizing said winding, a choking circuit having a gap bridged by a relatively stationary liquid resistor having means for controlling the magnetic effect of the winding, and an electrical responsive device governed by the magnetic effect of said winding.

10. In combination, a magnetic core in the form of a closed circuit, a conducting band or loop encircling the entire magnetic band or circuit, and a fluid column adapted to connect opposite sides of the conductor to a varying degree to form separate electrical loops about the magnetic core, and movable means for varying the conducting effect of the fluid column.

11. In combination, a magnetic core in the form of a closed circuit, a conducting band having a gap therein, said band encircling said magnetic circuit, a body of fluid adapted to bridge said gap, and a movable member adapted to be connected in parallel with a portion of the liquid in said gap.

12. In combination, a magnetic circuit excited from a source of perodically varying current, a second magnetic circuit arranged in shunt of said first magnetic circuit, and a short circuiting band for controlling the distribution of effective magnetic flux between said magnetic circuits, said band comprising a liquid resistor forming the major portion of the resistance of said band, and a conductor in parallel with said liquid resistor for varying the effective resistance thereof.

13. In combination, a magnetic core adapted to be energized by an alternating flux, a winding in inductive relation to said core, a body of fluid adapted to complete a short circuiting band about said core, means for varying the effective resistance of said body of fluid, said means comprisng a conductor in parallel therewith.

14. In combination, a magnetic core adapted to be energized by an alternating flux, a winding in inductive relation to said core, a body of a fluid of relatively high resistance adapted to complete a low resistance short-circuiting band about said core, and means for shunting a portion of the short circuiting current in said band around some of the fluid.

15. In combination, a magnetic core adapted to be energized by an alternating flux, a winding in inductive relation to said core, a body of fluid adapted to complete a short circuiting band of relatively low resistance about said core, said fluid having a relatively high resistance, and a conductor of relatively low resistance adapted to displace some of the fluid to vary the degree of short circuiting about said core.

16. In combination, a relatively fixed magnetic core, a relatively fixed winding in inductive relation to said core, means to magnetize said core with an alternating magnetic flux, a relatively stationary body of fluid in suitable relation to said core to control the effective magnetic inter-action between said core and said winding, and means for varying the effective conductivity of said body of liquid.

17. In combination, a magnetic core adapted to be energized by an alternating flux, a winding in inductive relation to said core, a stationary body of fluid adapted to complete a short circuiting band about said core, and means for varying the effective conductivity of said body of fluid to vary the degree of short circuit about said core.

18. In combination, a primary electric circuit adapted to be energized by a periodically varying electric current, a magnetic circuit linked with and adapted to be energized by said primary electric circuit, a relatively stationary liquid resistor controlling the effective permeability of said magnetic circuit, and movable means for varying the effective conductivity of said liquid resistor.

19. In combination, a winding adapted to be energized by a periodically varying current, a secondary winding in inductive relation to said first windng, and a relatively stationary body of conducting fluid for varying the inductive effect of said first winding upon the second winding and means for varying the effective conductivity of said body of fluid.

20. A relay system comprising a relatively stationary liquid resistor, the effective resistance of which is adapted to be varied by a controlling physical manifestation, a primary conductor normally energized to set up a periodically varying magnetic flux, and a secondary conductor in the range of action of said magnetic flux, said relatively stationary body of liquid being conductive and being disposed in suitable relation to the magnetic flux and having means for controlling the inter-action of the flux and the secondary conductor.

21. In combination, a magnetic circuit adapted to convey a magnetic flux, a winding linking a portion of the flux of said magnetic circuit, and means including a liquid resistor and a conductor shunting a portion of said liquid resistor for regulating the amount of flux linkage between said magnetic circuit and said winding.

22. In combination, a primary winding, a secondary winding, a magnetic core, magnetically connecting said windings, and a relatively stationary liquid resistor of variable conductivity for controlling the magnetic flux through said core linking with the secondary winding.

23. In combination, a magnet core, a primary winding on the core, a secondary winding on the core, an intermediate winding of low resistance, a liquid resistor for forming a connection of variable resistance across the terminals of the intermediate winding, and a conductor controlling by its position the resistance of said liquid resistor.

24. In combination, a main magnetic circuit excited from a source of periodic varying current, a magnetic circuit arranged in shunt of said first magnetic circuit, and means for controlling the distribution of effective magnetic flux between said magnetic circuits, said means comprising a liquid resistor and a conductor of low resistance in shunt of said liquid resistance.

25. In combination, a chamber, a magnetic core, a conductor of low resistance communicating with said chamber, said conductor embracing said core, a liquid resistor in the chamber adapted to connect adjacent parts of said conductor to secure a variable resistance in series with said conductor, and a movable conductor adapted to shunt a portion of the liquid resistor.

26. In combination, a magnetic core, a conductor of low resistance about said core, said conductor having adjacent portions, a body of conducting liquid for connecting said adjacent portions with greater or less conductivity, means responsive to the flux controlled by the flux in said core, means tending to produce a flux in the core, and means controlling the degree of conductivity between the portions of said conductor, said means comprising a movable conducting member in contact with said liquid.

27. In combination, a magnetic core, a conductor of low resistance about said core, said conductor having adjacent portions, a body of conducting liquid for connecting said adjacent portions with greater or less conductivity, means responsive to flux and controlled by the flux in said core, means tending to produce a flux in the core, and movable means controlling the degree of conductivity between the portions of said conductor by displacing a portion of said body of liquid.

28. In combination, a magnetic circuit, a primary winding on one part of said circuit, said winding being adapted to be connected to a source of alternating current which is subject to fluctuation, a secondary winding on another part of said magnetic circuit, said secondary winding being connected to a circuit which is to be kept at substantially a constant potential, a body of conducting fluid controlling the flux in that part of the magnetic circuit which controls the secondary winding, and means subject to the variations of voltage on the primary winding for varying the effect of said body of conducting fluid.

29. In combination, a magnetic circuit, a primary winding on one part of the circuit, said winding being adapted to be connected to a source of alternating current subject to variations of voltage, a secondary winding on another part of said magnetic circuit, said secondary winding being adapted to be connected to a circuit which is to be kept at substantially a constant potential, a body of conducting fluid controlling the flux in that part of the magnetic circuit which controls the secondary winding, and means responsive to the voltage on the secondary winding for varying the effect of said body of conducting fluid.

30. In combination, a primary conductor, a secondary conductor in inductive relation to the primary conductor, a magnetic core common to said conductors, and a conducting member about said core comprising a body of conducting liquid and a movable member in said liquid, said conducting member being adapted to have a greater or less flow of current therethrough to govern the distribution of magnetic flux in said core.

31. In combination, a closed magnetic circuit, means for creating a flux in said magnetic circuit, means responsive to the flux in one part of the circuit, a choking conductor about said circuit for varying the effect of the flux upon said one part of the magnetic circuit, and a movable electrode for controlling the conductivity of said choking conductor.

32. In combination, a main electric circuit and regulating means therefor comprising a magnetic circuit, a regulating winding connected with said main circuit, said regulating winding being linked by said magnetic circuit, a short circuit winding linked by said magnetic circuit, and being governed to vary the flux through said regulating winding, and means operated by voltage fluctuations in the main circuit for governing the effectiveness of said short circuit winding.

33. In combination, a relatively stationary body of mercury, an alternating current circuit of such low voltage that said body of mercury forms a major portion of the resistance of the circuit, said relatively stationary body of mercury being included in said circuit, a second alternating current circuit of relatively much higher voltage than said first circuit adapted to be regulated, a magnetic core forming a magnetic link between said circuits, the magnetic core serving as a linking medium between said circuits.

34. In combination, a body of mercury, an alternating current circuit of such low voltage that said body of mercury forms a major portion of the resistance of the circuit, said mercury being included in said circuit, a second alternating current circuit of relatively much higher voltage than said first circuit adapted to be regulated, a magnetic core forming a magnetic link between said circuits, the magnetic core serving as a linking medium between said circuits, said low voltage circuit comprising a movable electrode for varying the resistance of the mercury.

35. In combination, a solenoid having a movable core, a body of liquid, a resistance controlling member governing the voltage on said solenoid, said member being partially submerged in said liquid and connected to said core, the variations of pull of said core by the solenoid over a certain range of positions being substantially equalized by variations of buoyancy of said member so that the core will stand substantially stationary at any point within said certain range when a constant voltage is impressed upon said solenoid.

36. In combination, a constant potential main, a solenoid connected to said main, said solenoid having a movable core, a body of liquid, a liquid displacing member partially submerged in said liquid and connected to said core, said member controlling the voltage impressed upon said solenoid, the variations of pull of said core by the solenoid over a certain range of positions being substantially equalized by variations in buoyancy of said displacing member so that the core will stand substantially stationary at any point within said certain range and maintain a constant potential upon said solenoid.

37. In combination, a solenoid having a movable core system, a body of liquid into which a part of said core system projects, the variations of pull of the solenoid upon the core over a certain range of positions of the core being substantially equalized by variations in buoyancy of said liquid upon said core system so that the core will stand substantially stationary at any point within said certain range.

38. In combination, three magnetic cores connected together in parallel, two of said cores having windings thereupon, one of said cores being separated from the others by an air gap, a short circuiting band connected around the magnetic material connecting the two wound cores, one of said wound cores having a winding connected to a source of supply of alternating current and the other wound core having a winding connected to a constant voltage line, an electro-responsive winding connected to said constant potential line, and controlling the degree of short circuiting effected by said short circuiting loop on said magnetic member.

39. In combination, a primary winding, a secondary winding, magnetic material interlinking said windings, a short circuiting winding about said magnetic material, an electro-responsive device connected to the terminals of the secondary winding and a member controlled by the electro-responsive device for governing the short circuiting winding to control the transformation ratio between the primary winding and the secondary winding.

40. In combination, a primary winding, a secondary winding, magnetic material interlinking said windings, in a closed magnetic circuit, a low resistance loop about said magnetic material, said loop including a body of mercury, voltage control means connected to the secondary winding for varying the resistance of the mercury in said loop.

41. In combination, a primary winding, a secondary winding, a magnetic core interlinking said windings in a substantailly closed magnetic circuit, a low resistance conductor forming a loop about said magnetic material for affecting the transformation ratio between the primary and secondary, and a relatively stationary body of mercury having movable means for varying the resistance thereof to control the current flow in said loop.

42. In combination, a magnetic core, a winding on said core, a low resistance winding of low voltage on said core, a body of mercury for controlling the current flow through said low voltage winding, and a movable electrode for varying the resistance of the body of mercury.

43. In combination, a magnetic core, a winding on said core, a low voltage low resistance winding on said core, and a relatively stationary liquid resistor having movable means for varying the resistance thereof, said relatively stationary liquid resistor connecting the terminals of said low voltage winding.

44. In combination, a magnetic core, a winding on said core, said winding being adapted to be connected to a source of alternating current, a low voltage low resistance winding on said core, a liquid resistor connecting the terminals of said low voltage winding, and a displacing member partially submerged in said liquid resistor for controlling the resistance between the terminals of said low voltage winding.

45. In combination, a magnetic core comprising three magnetic limbs connected together in parallel, a primary winding on one limb, a secondary winding on another limb, means for retarding the flow of magnetic flux to the third limb, and means for forcing the magnetic flux away from the secondary winding through said third limb.

46. In combination, a closed magnetic core having a primary winding upon one portion thereof, a secondary winding upon another portion thereof, a short circuiting loop between said portions surrounding said core, said loop comprising a body of insulation between its ends and a pair of conducting members forming with said body of insulating material a chamber, a body of conducting fluid such as mercury in said chamber, and a movable core submerged in said body of mercury.

47. In combination, a magnetic core having an energizing winding thereupon, a short circuiting loop about a portion of said core, said loop including a body of mercury and a displacing member partially submerged in the mercury for varying the resistance of the mercury.

48. In combination, a magnetic core having an energizing winding thereupon, a short circuiting loop having its ends connected by a body of mercury, a copper rod projecting into said body of mercury and being adapted to vary the resistance of said body of mercury between the terminals of said loop.

49. In combination, a magnetic core having an energizing winding thereupon, a short circuiting loop having its terminals connected by a body of mercury, and a compound plunger in said body of mercury, said compound plunger comprising an insulating member and a conducting member for varying the resistance of the body of mercury between the terminals of said short circuiting loop.

50. In combination, a body of liquid, a pair of conducting terminals in electrical contact with said body of liquid, a displacing member in said body of liquid for varying the resistance between said terminals, an electric circuit, means for regulating the voltage on said circuit by the movement of said displacing member, and means controlled by the voltage on said circuit for moving said displacing member.

In witness whereof, I hereunto subscribe my name this 11th day of February, A. D. 1920.

ALFRED HERZ.